United States Patent [19]
Cannon et al.

[11] Patent Number: 5,662,783
[45] Date of Patent: Sep. 2, 1997

[54] ELECTROCHEMICAL MACHINING OF AEROFOIL BLADES

[75] Inventors: Alan J. Cannon, Chepstow; Alan D. Staines, Bristol, both of Great Britain

[73] Assignee: Rolls-Royce plc, London, Great Britain

[21] Appl. No.: 636,693

[22] Filed: Apr. 23, 1996

[30] Foreign Application Priority Data

May 11, 1995 [GB] United Kingdom ............... 9509587

[51] Int. Cl.⁶ ................................................. B23H 3/00
[52] U.S. Cl. ............................... 204/224 M; 204/225
[58] Field of Search ............................ 204/224 M, 225

[56] References Cited

U.S. PATENT DOCUMENTS

| | | |
|---|---|---|
| 3,723,268 | 3/1973 | Johns et al. . |
| 4,256,555 | 3/1981 | Wilson et al. ............... 204/224 M |
| 4,772,372 | 9/1988 | Bruns et al. ............... 204/224 M X |
| 5,149,405 | 9/1992 | Bruns et al. ............... 204/224 M X |
| 5,244,548 | 9/1993 | Bruns et al. ............... 204/224 M X |

FOREIGN PATENT DOCUMENTS

| | | |
|---|---|---|
| 1135571 | 12/1965 | United Kingdom . |
| 1065485 | 4/1967 | United Kingdom . |
| 1218546 | 6/1971 | United Kingdom . |
| 1255930 | 12/1971 | United Kingdom . |
| 2 021 645 | 5/1979 | United Kingdom . |

*Primary Examiner*—Donald R. Valentine
*Attorney, Agent, or Firm*—Oliff & Berridge

[57] ABSTRACT

An electrode assembly (10) for an electrochemical machining apparatus comprises a plurality of electrodes (18,20) for location adjacent a workpiece (12) to be machined, at least one of the electrodes (18,20) being movable towards the workpiece (12) during an electrochemical machining operation. The moveable electrodes (18,20) have a machining face (19,21) shaped to a desired contour and at least one side member (32,34) arranged to move with the electrodes (18, 20) as the electrodes approach the workpiece (12). The side members (32,34) are fixed to and move with the electrodes (18,20) at all times during the electrochemical machining operation.

11 Claims, 4 Drawing Sheets

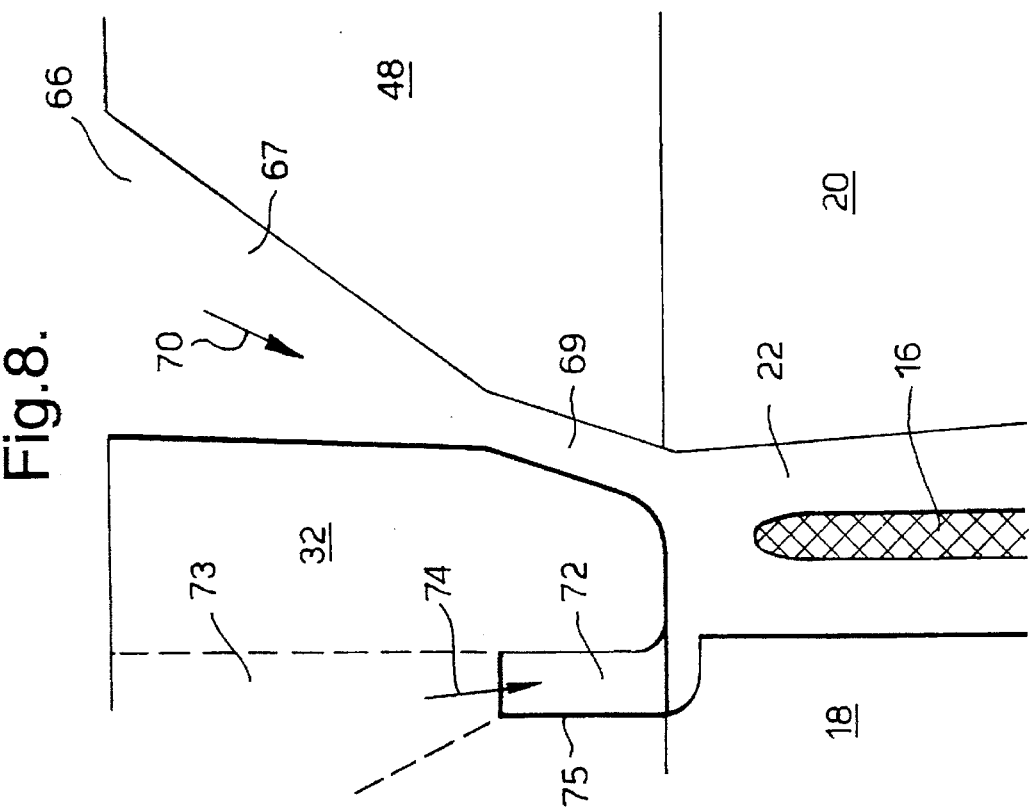
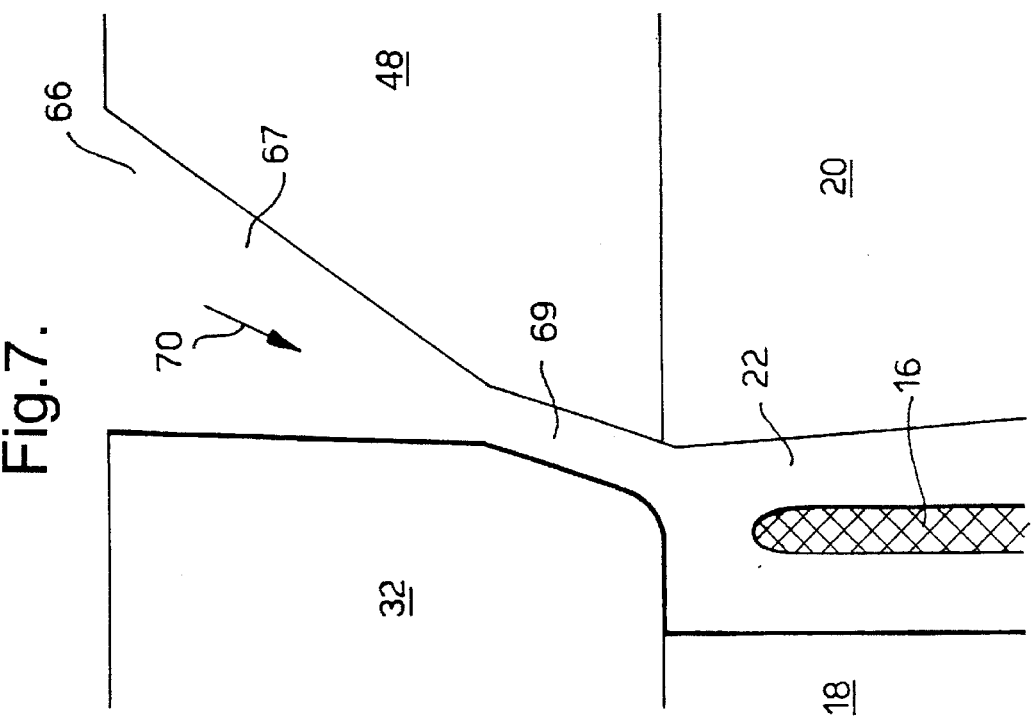

5,662,783

ELECTROCHEMICAL MACHINING OF AEROFOIL BLADES

This invention concerns improvements in or relating to electrochemical machining, and concerns particularly but not exclusively the electrochemical machining ("ECM") of aerofoil shaped blades for turbine engines.

An aerofoil shaped blade for a turbine engine, especially an aircraft turbine engine, usually comprises an aerofoil portion having curved sides and extending up from a platform to a tip. A root section below the platform attaches the blade to a rotor disk.

A difficulty in the production of such a blade lies in the sequence of operations which an operator performs in machining the root platform and aerofoil sections.

For instance, if the operator machines the aerofoil section first, that aerofoil section will not have sufficient strength during subsequent machining operations on the root, and the operator will therefore have to use an encapsulation technique to prevent damage to the aerofoil.

On the other hand, if the operator machines the root section below the platform first, he will have to control subsequent machining of the aerofoil very carefully in order to maintain correct positioning of the aerofoil in relation to the root.

ECM techniques provide a convenient way of machining the aerofoil through 360° in a controlled manner. For instance, U.S. Pat. No. 3,723,268, assigned to Production Engineering Research Association of Great Britain, describes the principles and general techniques of 360° ECM. There are a number of processes using these techniques for machining aerofoil sections of blades, as follows.

In a first such process, described in British Patent 1,135,571, the electrodes remain static and enclose a workpiece blade during the machining operation. The workpiece may, for example, be an aerofoil blade. The operator carries out the process in steps using a series of electrodes which are designed to be successively closer approximations to the required shape of the finished aerofoil. This is necessary because the machining gap between the electrode and the aerofoil must not become too large if the process is to remain efficient.

In this first prior art process, in order to minimize the number of electrodes, the operator can preform the aerofoil to approximately the desired shape before the 360° ECM process begins. However, this has the disadvantage that additional operations, such as extrusion, forging, or casting, will be required to produce the appropriate preformed shape. Each additional operation adds to the overall cost of the process.

There is a second prior art process which involves the use of moveable electrodes. This has an advantage over the first process in that the operator is able to use less expensive preforms. However, there are significant difficulties in producing the true shape required in the aerofoil by this second process, particularly at the leading and trailing edges, because, as the electrodes move closer together and the aerofoil approaches its final desired shape, electrical field effects begin to machine the leading and trailing edges.

It is possible in this second process to contour the electrodes at their edges so as to control the machining effect of the field on the edges of the aerofoil, but it is found that the modified shape of the electrodes distorts the shape produced in the earlier stages of the machining process. It is difficult to produce an electrode shape which will provide a compromise between the distorted shape arising out of the early stages of machining and the field effects of the later stages.

This difficulty is increased if the starting shape is a rough forging. In such circumstances it is virtually impossible to attain the required edge geometry. Consequently, it is almost always necessary to finish the production process with a polishing process on the leading and trailing edges. This is time consuming and adds to the overall cost of the blades.

The invention claimed and described in British Patent 2,021,645 seeks to overcome the above problems of 360° ECM by providing moveable side plates in association with the electrodes.

We have found that there are possible disadvantages in the use of moveable side plates in that the plates can stick or jump out of position. This can cause undesirable shaping of a blade (that is, non-conformance to specification) and may also cause damage to tooling, which will result in additional tool repair costs.

The nature of current 360° electrode side plate design demands that radial electrolyte flow paths are used because the side plates abut at the end of the machining cycle. This limits the length of blade that can be machined by this process to about 5 inches or 12.5 cm. It is known that blade lengths in excess of 6 inches or 15 cm. are difficult to operate on in a 360° ECM process.

The present invention seeks to provide an apparatus for electrochemically machining an aerofoil shaped blade, or other article having side and end surfaces, over the full 360° of its side surfaces, to such a degree that on completion of the ECM process the blade is machined to its required shape and no further machining or polishing operations will be required.

According to the present invention there is provided an electrode assembly for an electrochemical machining apparatus, the assembly including a pair of electrodes positioned on a common axis so as to define an electrolyte-containing space within which a workpiece to be electrochemically machined is located the electrodes being relatively movable along the axis during an electrochemical machining operation, the first electrode having a machining face shaped to a desired contour and at least one side member fixed to one side of the first electrode, movable with the first electrode and arranged to extend over the workpiece as the first electrode moves towards the second electrode, during the electrochemical machining operation.

By providing a side member, or side plate, fixed to and moving with the main body of an electrode, the invention overcomes the above disadvantages which are associated with side plates that are moveable relative to the electrode.

The invention will now be described by way of example only with reference to the accompanying diagrammatic non-scale drawings in which, FIG. 1 is a section through an ECM electrode assembly and an aerofoil blade precursor, in a starting mode;

FIG. 7 is an enlargement of a portion of FIG. 6; and

FIG. 8 is an enlargement of a portion of FIG. 6 showing a further modification to the apparatus of the invention.

Figure 1:
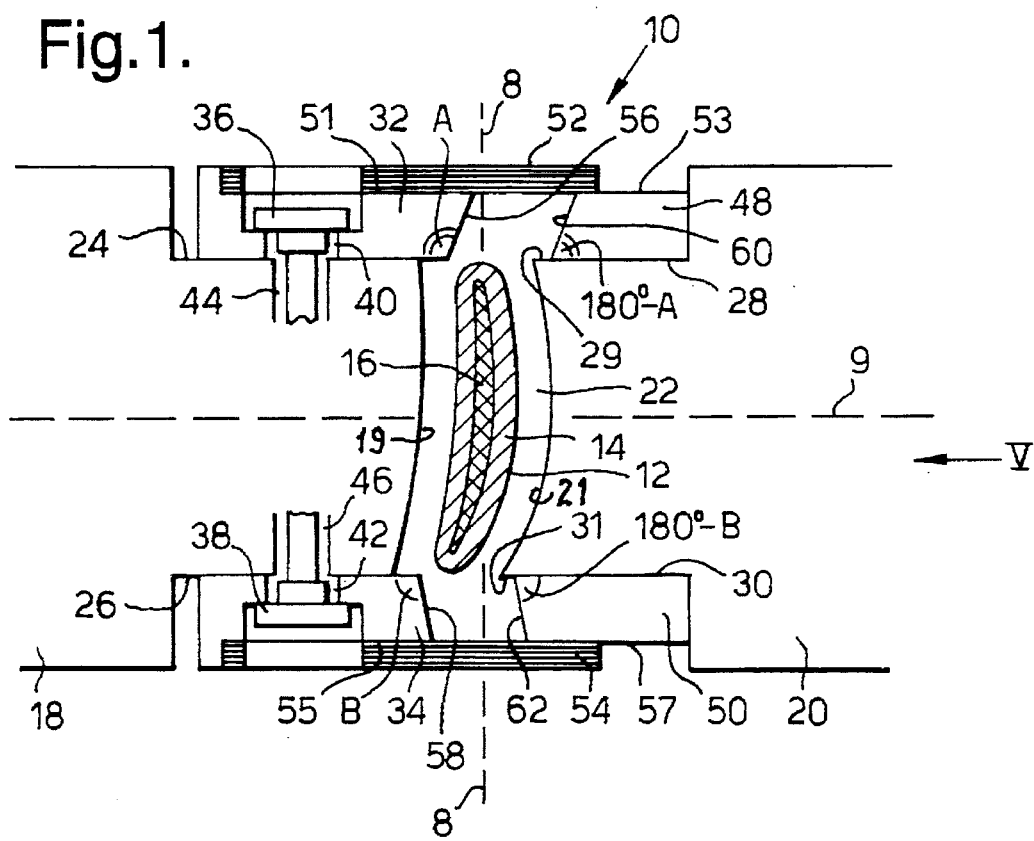
Figure 2:
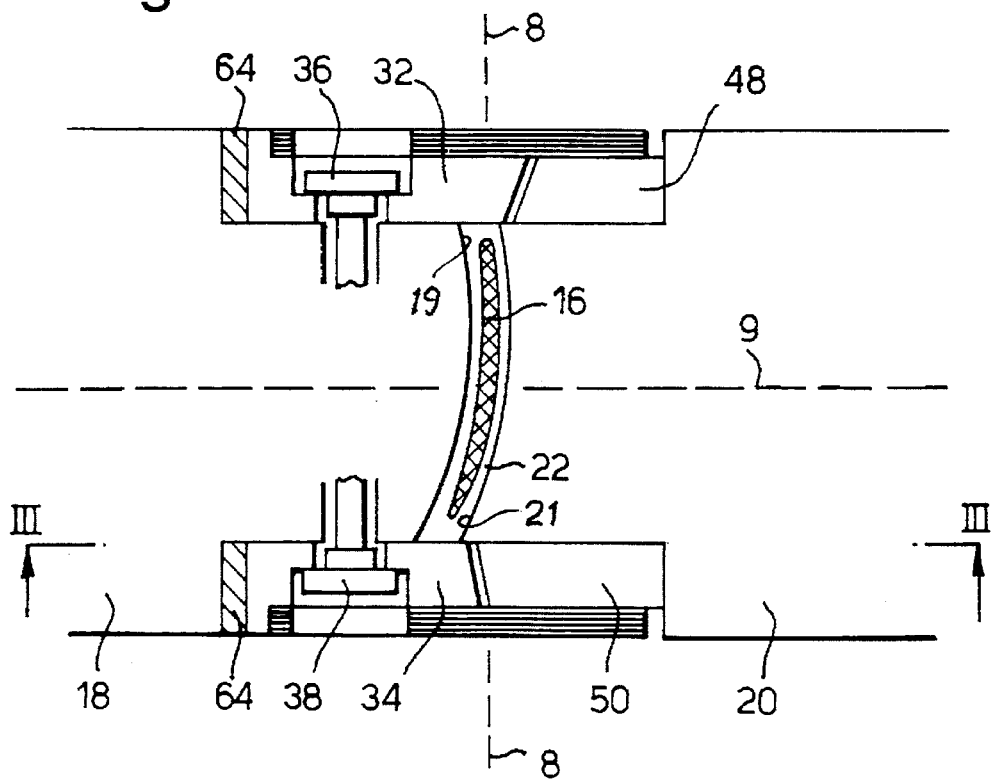
FIG. 2 is the section of FIG. 1 in a finishing mode.
Figure 5:
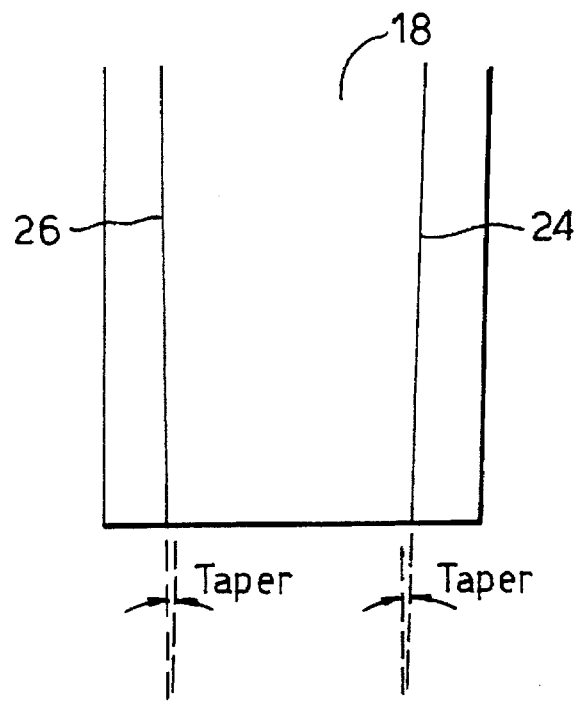
FIG. 5 is a view on the front of an electrode of FIG. 1 taken in the direction of arrow V.

Referring to the drawings there is shown in FIGS. 1, 2 and 5 an electrode assembly 10 for electrochemically machining an aerofoil-shaped article 12. The article 12 is in particular a gas turbine blade and is shown in FIG. 1 as a rough fashioned precursor shape 14, indicated by single diagonal hatching, enclosing an intended finished aerofoil shape 16 indicated by cross-hatching. The start and finish positions of the electrode assembly machining from an oversize forging are shown in FIGS. 1 and 2 respectively.

The electrode assembly 10 comprises a movable convex electrode 18 in line with and facing a fixed concave electrode 20 along a common axis 9. Both electrodes are formed of a copper alloy, basically a copper/chrome alloy. The convex electrode 18 is arranged to move towards and away from the concave electrode 20 along the axis 9. The respective convex and concave faces (19,21) of the electrodes 18,20 enclose a working space 22 in which is located the aerofoil blade 12. Electrolyte passes radially through the working space 22. The blade structure (which will ultimately be the convex face of the blade in the finished shape 16) faces the concave electrode 20, and the concave face of the finished blade similarly faces the convex electrode 18.

The electrodes 18,20 are respectively provided with recessed pairs of opposed planar side surfaces 24,26 and 28,30 which are disposed parallel to and distal from the axis 9. Surfaces 24 and 28, although separated by the working space 22, are coplanar. Likewise, surfaces 26 and 30, also separated by the working space 22, are coplanar. Located on the recessed planar side surfaces 24 and 26 of the movable electrode 18 are respective side plates 32 and 34 which are located on, and secured to, the electrode by means of respective stainless steel fixing bolts 36,38 passing through respective apertures 40,42 in the side plates 32,34 and into respective threaded holes 44,46 in the electrode. The side plates 32,34 project over the working space 22.

The apertures 40,42 in the side plates 32,34 are made sufficiently larger than the shanks of the respective fixing bolts 36,38 so that the side plates may be slid to required positions on the recessed surfaces 24,26 before the bolts are tightened. Hence, the amounts by which the side plates 32,34 overlap the working space 22 may be easily controlled.

Located on the recessed planar side surfaces 28 and 30 of electrode 20 are respective side plates 48 and 50 which are opposed respectively to the side plates 32 and 34. Side plates 48,50, unlike side plates 32 and 34, are fixed immovably to the surfaces 28,30 by suitable fixing means such as bolts, welds, or interlocks, and are dimensioned and located so that they are recessed away from and do not project over the working space 22. Hence, there provided free areas 29,31 of the surfaces 28,30 between the side plates 48,50 and the working space 22.

Because surfaces 24 and 28 are coplanar and surfaces 26 and 30 are coplanar (as described above) it will be seen that if electrode 18 is moved towards electrode 20 then side plate 32 will lap onto the free area 29 of surface 28, and side plate 34 will likewise lap onto the free area 31 of surface 30. Thus, the side plates 32,34 respectively lapping onto the surfaces 28,39 provide an enclosed working space 22. This situation is illustrated in FIG. 2.

An outer surface 51 of side plate 32—that is, the surface distant from surface 24—is provided with an insulating extension side plate 52 which extends over the gap between side plates 32 and 48 to lap onto a corresponding outer surface 53 of side plate 48. A similar outer surface 55 of side plate 34 is also provided with an insulating extension side plate 54 which extends over the gap between side plates 34 and 50 to lap onto a corresponding outer surface 57 of side plate 50. These plates 52,54 may be formed of a glassfibre reinforced, epoxy banded laminate material, such as is sold under the trade name TUFNOL.

The leading or front face 56 of side plate 32 is at an angle A to axis 9, and the leading or front face 60 of side plate 48 is at a complementary angle of 180°-A to axis 9. In a similar manner the leading or front face 58 of side plate 34 is at an angle B to axis 9, and the leading or front face 62 of side plate 50 is at a complementary angle of 180°-B to axis 9.

The angled planes of the leading faces 56,58,60,62 are used to increase the relative machining gap as compared to planes at right angles to the axis currently used on 360° ECM electrode sideplates. It is found that the increase in the machining gap by this angled-plane technique reduces the risk of spark-out in this area.

As shown in FIG. 2 adjustable shims 64 are provided between the back ends of sideplates 32,34 and electrode 18 so as to provide for increasing or decreasing the chord of the blade being machined.

Figure 3:
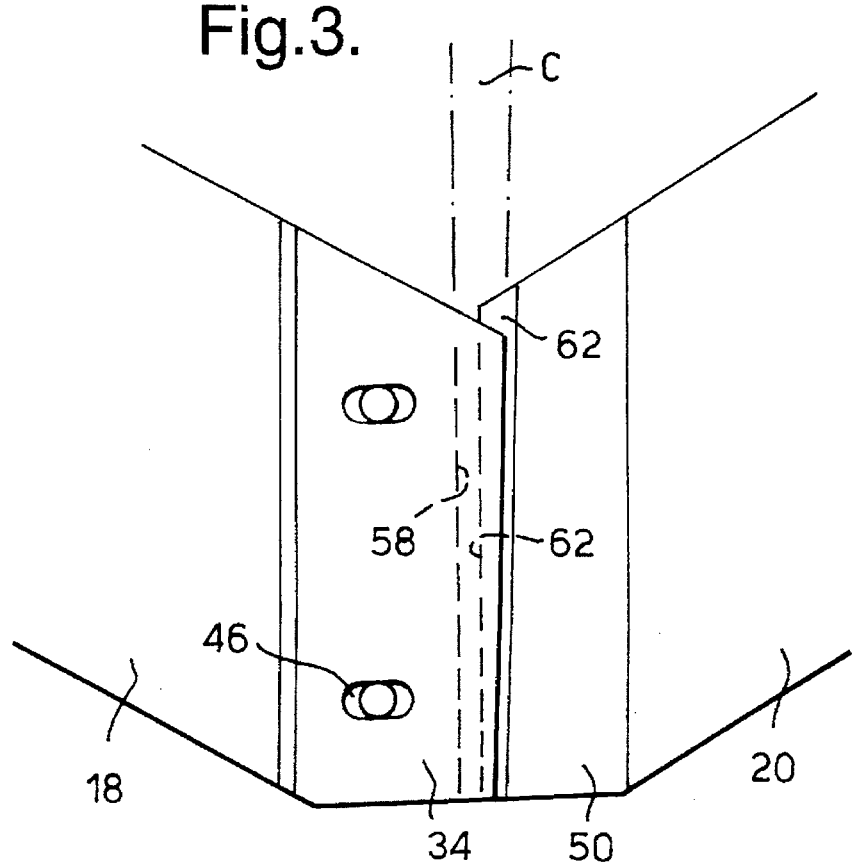
FIG. 3 is a section through the assembly of FIG. 2 taken at line III—III.
Figure 4:
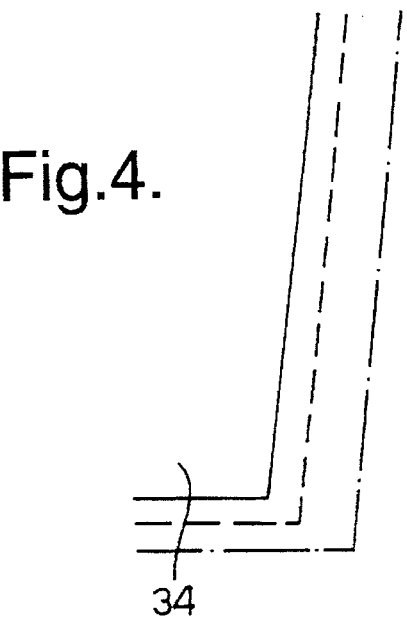
FIG. 4 is an enlargement of a portion of FIG. 2.

As shown in in part in FIG. 3 the leading faces of the side members 32,34 of electrode 18 are parallel to a second axis 8 between the electrodes at right angles to the common axis 9, and the leading faces of the fixed sideplates 48,50 of electrode 20 present an angle C to axis 8. Hence, as shown in FIG. 3, the fixed sideplate 50 has a shearing angle C with respect to the movable sideplate 34. The shearing angle C gradually machines material away from the tip end of the precursor shape 14 to the platform end of the blade chord. This reduces the risk of metal from the chordal flash at the root end of the blade making contact with the sideplates and causing a spark-out as it is carried away by electrolyte. The progressive shearing action along each chordal edge of the blade aerofoil is shown in more detail in FIG. 4.

FIG. 5 shows a tapered electrode body which compensates for the shearing angled face. Because the dwell time is longer at the tip chord than at the root end chord due to the shearing angle, the tapered electrode body has a compensating effect by allowing the finish machining gap along the chordal length of the blade to vary at the stop position to produce a parallel chord.

Figure 6:
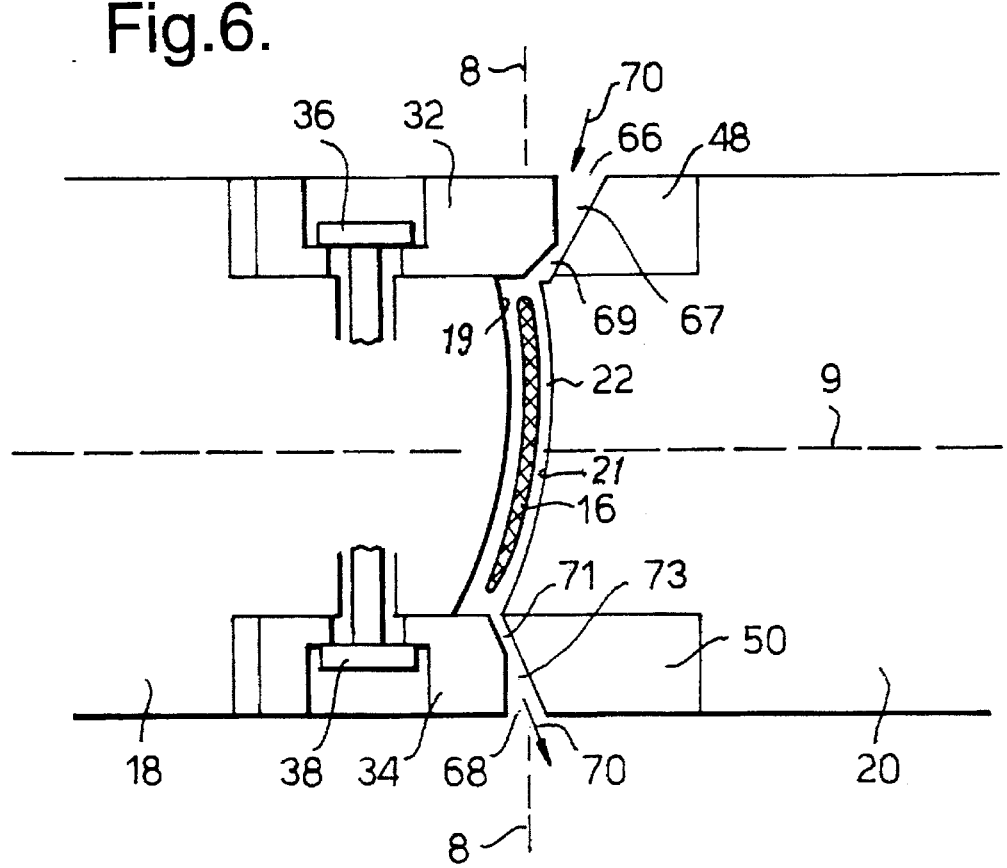
FIG. 6 is the view of FIG. 2 modified to show electrolyte flow in the electrode assembly.

FIGS. 6–8 depict a further embodiment of the invention in which there is shown a method of flowing electrolyte across the chord whilst retaining the use of sideplates to finish machine leading and trailing edge radii. This technique is used in conjunction with the fixed sideplate configuration described above. FIG. 8 shows a further feature added to the apparatus of FIG. 6 and 7.

FIG. 6 shows a simple crossflow sideplate configuration in which there is provided an inlet passage 66 for electrolyte between sideplates 32 and 48, and an outlet passage 68 between sideplates 34 and 50 on the opposite side. Passage 66 has a tapering inlet portion 67 which converges to a parallel-sided portion 69 leading into the working space 22. Likewise, the outlet passage 68 comprises a parallel-sided portion 71 leading from the working space 22 to a diverging exit portion 73. The flow direction of the electrolyte is indicated by arrow 70. FIG. 7 is an enlargement, for clarity, of the inlet passage 66 of FIG. 6.

It will be observed, as shown in FIG. 6 in respect of sideplates 48 and 50, and more clearly in FIG. 7 in respect of sideplate 48, that these sideplates are not recessed back from the working space 22, as in the embodiment of FIG. 1–5, but are continuous with the concave face of electrode 20.

FIG. 8 shows a secondary electrolyte inlet 72 or flow port in that part of sideplate 32 which extends over or overlaps the working space 22. A corresponding outlet (not shown) is provided in a corresponding portion of sideplate 34. The secondary inlet port 72 is shaped similarly to passage 66 in that it has a tapering inlet portion 73 converging to a parallel-sided portion 75 which discharges into the working space 22. The electrolyte flow through inlet 72 is indicated by arrow 74. The secondary inlet 72 enables greater accuracy to achieved in machining the adjacent blade radius within the working space 22 and/or the chordal width of the blade.

The embodiments of FIGS. 6–8 allow the machining of aerofoil leading and trailing edges on any blade length by retaining the sideplate geometries but flowing the electrolyte chordwise. The limiting factor now becomes the chord width which should not now exceed about 6 inches or 15 cm.

We claim:

1. An electrode assembly for an electrochemical machining apparatus, the assembly comprising first and second electrodes positioned on a common axis so as to define a space adapted to receive a workpiece to be electrochemically machined, the electrodes being relatively movable along the axis during an electrochemical machining operation, the first electrode having a machining face shaped to a desired contour and a first side member fixed to a first side of the first electrode movable with the first electrode and arranged to extend over the space as the first electrode moves towards the second electrode, during the electrochemical machining operation.

2. An electrode assembly as claimed in claim 1 wherein the first electrode is provided with a second side member on a second side of the first electrode opposed to the first side, said second side member also being arranged to move with the first electrode and to extend over the space as the first electrode moves towards the second electrode, said second side member being fixed to and moving with the first electrode during the electrochemical machining operation.

3. An electrode assembly as claimed in claim 1 wherein the second electrode is provided with a first side member fixed to a first side thereof.

4. An electrode assembly as claimed in claim 3 wherein said first side member of the second electrode is recessed from the front face of said second electrode.

5. An electrode assembly as claimed in claim 3 wherein the second electrode is provided with a second side member fixed to a second side of the second electrode opposed to the first side thereof.

6. An electrode assembly as claimed in claim 5 wherein each side member of the electrodes is provided with a leading face that is angled to the common axis of the electrodes, the angles of the leading faces of the side members of the second electrode being complementary to the angles of the leading faces of the corresponding side members of the first electrode.

7. An electrode assembly as claimed in claim 6 wherein the leading faces of the side members of the first electrode are parallel to a second axis at right angles to said common axis, and the leading faces of the side members of the second electrode present an angle to said second axis, whereby the side members of the second electrode present a shearing angle with respect to the side members of the first electrode.

8. An electrode assembly as claimed in claim 4 wherein there is provided an electrolyte inlet between the first side member on the first electrode and the corresponding first side member on the second electrode, the inlet leading into the space between the electrodes, and an electrolyte outlet from the space between the electrodes, the outlet being located between the second side member on the first electrode and the corresponding second side member on the second electrode.

9. An electrode assembly as claimed in claim 8 wherein there is provided a further electrolyte inlet into the space between the electrodes, the further inlet being provided in that portion of the first side member of the first electrode which extends over the space, and a further electrolyte outlet from said space, the further outlet being provided in that portion of the second side member of the first electrode which extends over the workpiece.

10. An electrode assembly as claimed in claim 1 wherein at least one electrode is tapered.

11. An electrode assembly as claimed in claim 1 wherein electrolyte flow is across said space from one side of the electrodes to the opposite sides of the electrodes.

* * * * *